Patented Apr. 18, 1944

2,346,771

UNITED STATES PATENT OFFICE 2,346,771

ANTHRAQUINONE COMPOUNDS

Frank Lodge, Arthur Lowe, and William Wyndham Tatum, Blackley, Manchester, England, assignors to Imperial Chemical Industries Limited, a corporation of Great Britain No Drawing. Application October 1, 1941, Serial No. 413,234. In Great Britain October 8, 1940

5 Claims. (Cl. 260—379)

This invention relates to new anthraquinone compounds, namely to certain 1:4-diaminoanthraquinone derivatives and to their sulphuric esters.

The said derivatives are those in which each of the two amino substituents carries an alcoholic or substituted alcoholic radical. These radicals are those of the general formula

R.CH.R'OH in which R and R' stand for alkyl and alkylene radicals, one of which may carry an additional hydroxy group, and the anthraquinonylene radical may carry simple anthraquinone wool dye substituents e. g. hydroxy groups and halogen atoms.

The new compounds dye acetate rayon: the sulphuric esters also dye wool and other animal fibres. The dyeings on acetate rayon and animal fibres are bright and fast to light and the wool dyestuffs have very good levelling properties.

According to the invention we make the 1:4-diaminoanthraquinone derivatives by interacting a hydroxyalkylamine or substituted hydroxyalkylamine of general formula

R.CH(NH$_2$).R'OH where R and R' stand for the same as before, with a leuco anthraquinone derivative or a mixture of a leuco anthraquinone derivative and the corresponding unreduced anthraquinone derivative which carries hydroxy, amino or replaceable alkylamino groups in the 1 and 4 positions and then oxidising the resulting product, By corresponding unreduced derivative we mean not only the compound which is identical with the leuco one except for the fact of non-reduction, but other non-reduced compounds having different hydroxy, amino or replaceable alkylamino groups in the 1 and 4 positions. Thus, as an illustration, when using as leuco compound, leuco 1:4-diaminoanthraquinone, there may be used as corresponding unreduced compound, 1:4-diaminoanthraquinone or quinizarin.

Also according to the invention we make the sulphuric esters by treating the 1:4-diaminoanthraquinone derivatives with sulphuric acid or alkali metal pyrosulphates or other agents adapted to convert aminoalcohol derivatives to their sulphuric esters.

The simplest hydroxyalkylamine which can be used is 2-aminopropanol CH$_3$.CH(NH$_2$).CH$_2$OH. 3-amino-2-butanol, CH$_3$.CH(NH$_2$).CHOH.CH$_3$ and 3-amino-2'-methylbutanol,

CH$_3$.CH(NH$_2$).CH(CH$_3$).CH$_2$OH are examples of near homologues which can be used.

While the new anthraquinone compounds can be made from leucoquinizarin or other leuco- anthraquinone derivatives as defined above, it is usually convenient to use leucoquinizarin or a substituted derivative of leucoquinizarin. Although leuco-1:4-diamino-, leuco-1:4-dimethylamino and other leuco-1:4-derivatives of anthraquinone can be used, they give the same products as leucoquinizarin, because the substituents in the 1 and 4 positions are replaced in either case. As the leuco-1:4-diamino- and similar derivatives are, in general, less easily made than leucoquinizarin, and are in fact generally most conveniently made from leucoquinarine, they are generally more expensive than leucoquinizarin.

The production of the leuco compounds can be effected in situ, if desired.

Mixtures of two amines can be employed, if desired.

The following examples, in which parts are by weight, illustrate but do not limit the invention.

Example 1

30 parts of leucoquinizarin, 30 parts of 2-aminopropanol and 200 parts of isobutanol are stirred together at 100° C. for 24 hours. 1 part of piperidine and 1 part of 32% sodium hydroxide solution are added and a current of air passed in at 100° C. to oxidise the resulting leuco colour base. The colour base is filtered off, washed with ethanol and dried. When crystallised from a mixture of dichlorobenzene and nitrobenzene it forms bronzy-blue crystals of M. P. 229° C. Analysis: N—found, 7.75% C$_{20}$H$_{22}$O$_4$N$_2$ requires N—7.9%.

The compound dyes acetate rayon in bright blue shades.

Example 2

10 parts of the compound obtained in Example 1 are dissolved in 100 parts of 83% sulphuric acid at 0° C. and the solution poured into ice and water. The diluted acid is decanted and the residue dissolved in dilute sodium hydroxide solution, filtered from any insoluble matter and salted out.

The dyestuff is blue. It dissolves in water with a bright reddish-blue colour which becomes red on adding hydrochloric acid, and in 98% sulphuric acid with a bluish-red colour which becomes blue on adding formaldehyde. It dyes wool from an acid bath in level blue shades of very good fastness to light.

Example 3

10 parts of the compound obtained in Example 1 are added to a mixture of 10 parts of sodium pyrosulphate and 70 parts of dry pyridine, and stirred at about 90° C. for 2 hours. The melt is then poured into 100 parts of 5% aqueous sodium carbonate solution and the pyridine distilled off in steam. After filtering off any insoluble matter, the dyestuff is salted out by means of sodium chloride, filtered and dried at 60° C. It is similar in properties to the dyestuff of Example 2 and is essentially the sodium salt of the monosulphuric ester.

*Example 4*

34 parts of leucoquinizarin, 60 parts of 3-amino-2-butanol, 300 parts of water and 4 parts of sodium hydroxide are stirred together at 80° C. for 6 hours. The resulting leuco base is filtered off, washed, dried and oxidised by boiling with 200 parts of nitrobenzene, filtered, washed with ethanol and dried. The dry product is in the form of bronzy crystals of M. P. 241° C. It dyes acetate rayon in blue shades.

*Example 5*

The sulphuric ester of the compound produced in Example 4 is prepared as described in Example 2. It dyes wool evenly in bright blue shades of good fastness to light.

*Example 6*

40 parts of leucoquinizarin, 50 parts of 3-amino-2-methylbutanol and 60 parts of butanol are stirred together at 110–115° C. for 24 hours. The resulting leuco base is then oxidised by adding 5 parts of pyridine and passing in air. The base is isolated by steam distillation and crystallised from a mixture of methanol and water. It forms a blue powder of M. P. 194–6° C. and dyes acetate rayon in blue shades.

*Example 7*

The sulphuric ester of the compound of Example 6 is made by dissolving 10 parts of the compound in 100 parts of 83% sulphuric acid at 0° C. and then adding 98% sulphuric acid until a test sample is soluble in dilute aqueous sodium carbonate solution. The sulphonation mixture is poured into ice and water, filtered and the cake dissolved in dilute sodium hydroxide solution, filtered from any insoluble matter and the dyestuff salted out, filtered off and dried. It dyes wool in bright blue shades.

*Example 8*

12 parts of leucoquinizarin, 13 parts of 2-amino-1-butanol and 50 parts of isobutanol are boiled together under reflux for 12 hours. 0.5 part of piperidine are added and air passed in for 4 hours. The 1:4-di-(hydroxyisobutylamino)anthraquinone is filtered off and crystallised from nitrobenzene. It melts at 220–222° C. and gives a bright blue wool duestuff when sulphonated by the method of Example 3.

*Example 9*

5 parts of leuco-1:4:5:8-tetrahydroxyanthraquinone, 6 parts of 2-aminopropanol, 1.2 parts of boric acid and 30 parts of isobutanol are boiled together under reflux for 12 hours. The resultant leuco compound is filtered off and oxidised by heating at 150° C. with 12 parts of nitrobenzene containing a little piperidine. Treatment with sodium pyrosulphate in dry pyridine as described in Example 3 gives a sulphuric ester which dyes wool in bright bluish-green shades.

*Example 10*

5 parts of leuco 1:4-dimethylaminoanthraquinone, 5 parts of 2-aminopropanol and 25 parts of isobutanol are boiled together under reflux for 12 hours, and the resultant bronzy-blue crystals of 1:4-dihydroxyisopropylaminoanthraquinone filtered off and purified by crystallisation from phenol containing a little nitrobenzene. The product is identical with that of Example 1. In place of leuco-1:4-dimethylaminoanthraquinone, other leuco compounds such as leuco-1:4-diaminoanthraquinone may be used or a mixture of the two.

*Example 11*

50 parts of leucoquinizarin, 50 parts of dihydroxyisopropylamine (B. P. 161° C. at 8 mm.) and 250 parts of isobutanol are stirred together for 8 hours at 100° C. The product is filtered off and oxidised by heating to 150° C. with nitrobenzene, dichlorobenzene and a trace of piperidine. Blue crystals of 1:4-bis-(dihydroxyisopropylamino)-anthraquinone are thereby obtained having M. P. 265° C. Sulphonation by the method of Example 7 gives a very soluble sulphuric ester which dyes wool in bright blue shades.

*Example 12*

This is the same as Example 3, but 20 parts of pyrosulphate are used and a temperature of 95–100° C. and the resulting ester, which is a disulphuric ester, is salted out with potassium chloride. The dyestuff dyes in the same shades as that of Example 3.

*Example 13*

75 parts of water, 15 parts of quinizarin, 5.25 parts of sodium hydroxide, 15 parts of sodium hydrosulphite and 15 parts of 2-aminopropanol are stirred together in an atmosphere of nitrogen for 6 hours at 80° C. The leuco product is filtered off and oxidised by heating with nitrobenzene. The product is the same as that of Example 1.

We claim:

1. The alkali metal salts of the sulfuric acid esters of the anthraquinone compounds of the class consisting of those of the formula

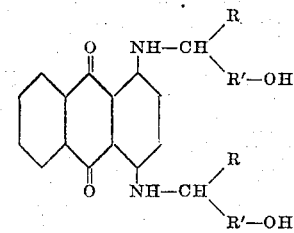

in which R stands for alkyl and mono-hydroxyalkyl radicals, R' stands for an alkylene radical, and in which each hydroxy substituted branched chain alkylamino group contains not more than 5 carbon atoms.

2. The alkali metal salts of the sulfuric acid esters of 1,4-di(beta-hydroxy-isopropylamino)-anthraquinone.

3. The sodium salt of the mono-sulfuric acid ester of 1,4-di(beta-hydroxy-isopropylamino)anthraquinone.

4. The alkali metal salts of the sulfuric acid esters of 1,4-di(beta-hydroxy-isobutylamino)anthraquinone.

5. The alkali metal salts of the sulfuric acid esters of 1,4-di(beta-hydroxy-alpha-methyl-isobutylamino)anthraquinone.

FRANK LODGE.
ARTHUR LOWE.
WILLIAM WYNDHAM TATUM.